July 5, 1960          K. GEBELE          2,943,551
PHOTOGRAPHIC SHUTTER
Filed May 20, 1955          2 Sheets-Sheet 1
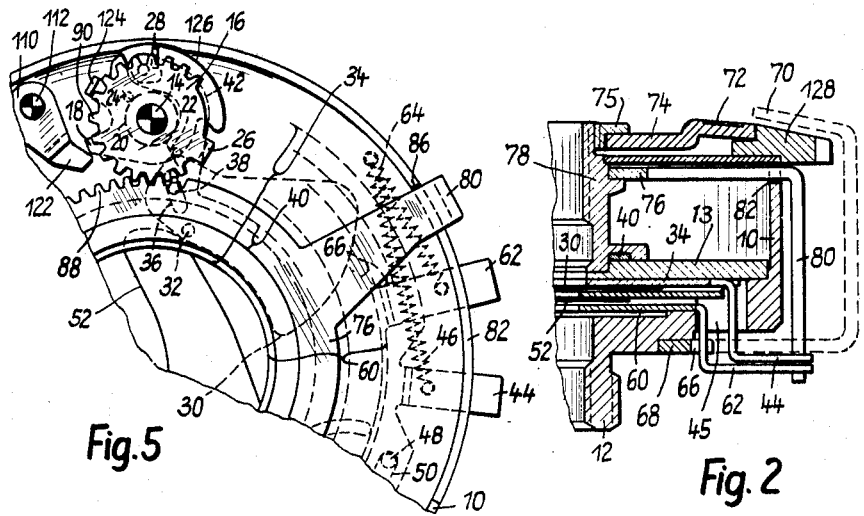
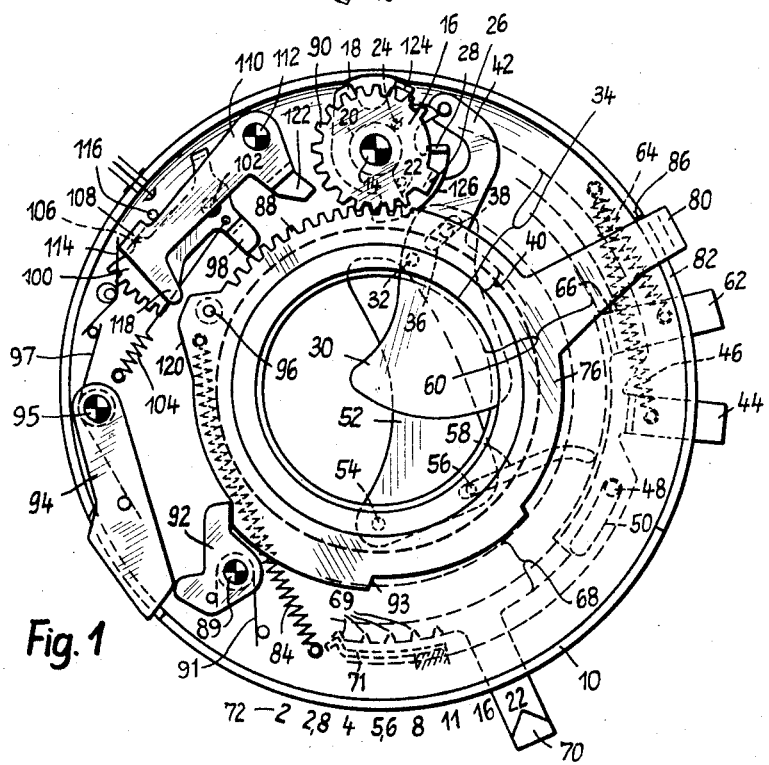

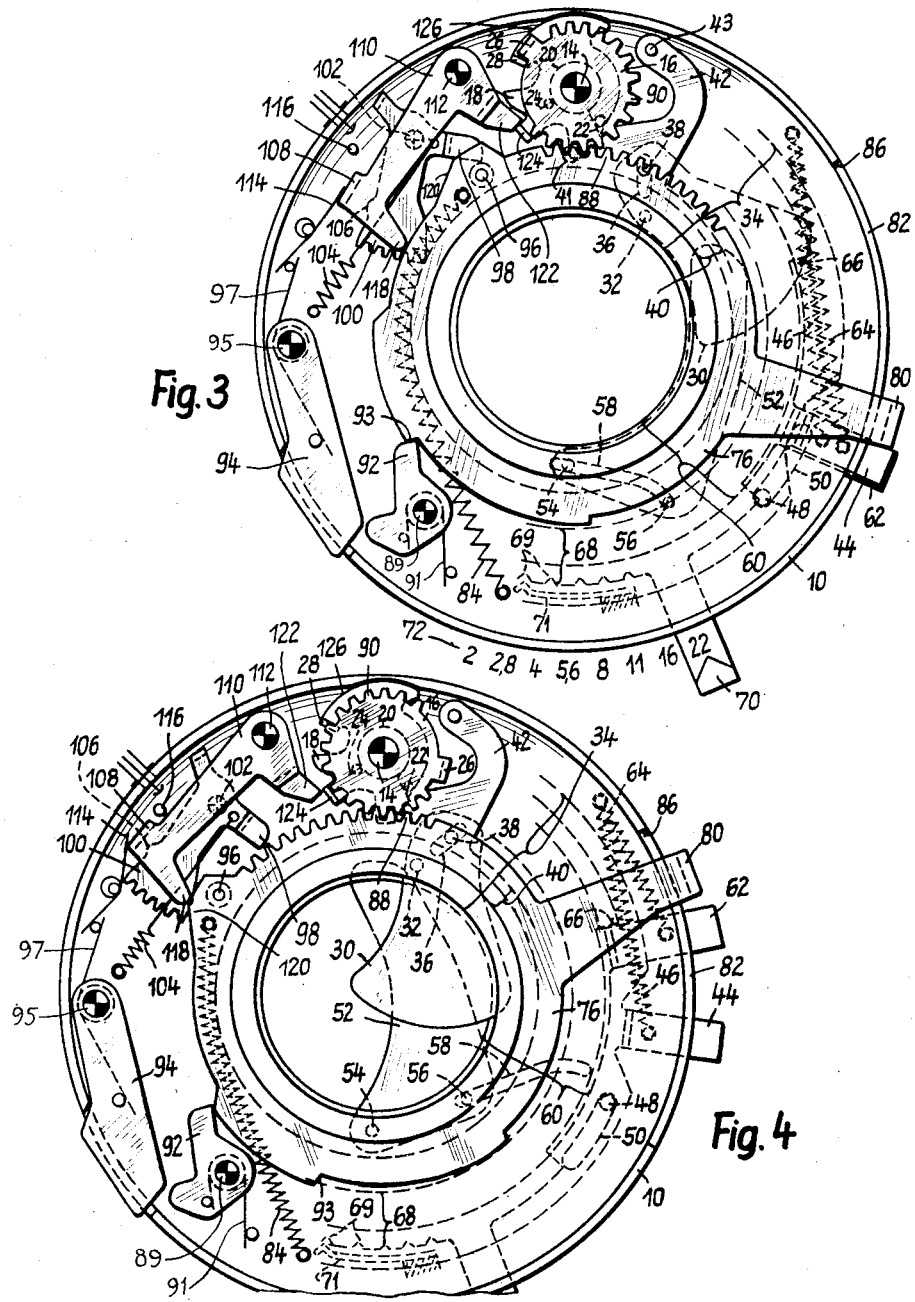

United States Patent Office 2,943,551  
Patented July 5, 1960

2,943,551

PHOTOGRAPHIC SHUTTER

Kurt Gebele, Munich, Germany, assignor, by mesne assignments, to Compur-Werk Friedrich Deckel OHG, Munich, Germany, a German firm Filed May 20, 1955, Ser. No. 509,929

Claims priority, application Germany May 28, 1954

7 Claims. (Cl. 95—64)

This invention relates to a photographic shutter of the objective or between-the-lens type.

An object of the invention is the provision of a generally improved and more satisfactory shutter of this kind, particularly adapted and intended for use with a camera which is to be focused by light admitted through the shutter, such as a camera of the single lens reflex type.

Another object is the provision of a shutter which may be opened for focusing by means of the same control parts used in cocking or tensioning the shutter, thus eliminating the need for extra control members.

Still another object is the provision of a shutter in which the opening of the blades for focusing purposes may be accomplished through control members extending out the back of the shutter and into the associated camera, so that the operator does not have to reach around to the front of the camera to engage blade-opening parts on the shutter itself, as has been necessary in most of the prior shutters of this general type.

A further object is the provision of a shutter of simplified, sturdy, and inexpensive construction in which the shutter blades and the diaphragm leaves or blades may be quickly and easily opened for focusing purposes, and in which the diaphragm leaves or blades will subsequently be closed down automatically to any aperture size previously selected for the exposure, after being fully opened for focusing purposes.

These and other desirable objects may be attained in the manner disclosed as an illustrative embodiment of the invention in the following description and in the accompanying drawings forming a part hereof, in which:

Fig. 1 is a front view of a shutter in accordance with a preferred embodiment of the present invention, with the cover plate and various other parts omitted for the sake of simplicity and clarity, the shutter parts being shown in normal run-down or rest position with the shutter blades closed and the diaphragm leaves or blades stopped down to a preselected aperture size;

Fig. 2 is a fragmentary radial section taken through the right hand part of the shutter;

Fig. 3 is a view similar to Fig. 1, showing the parts of the shutter in set or tensioned position, with both the shutter blades and the diaphragm leaves or blades wide open to admit light for focusing;

Fig. 4 is a similar view showing the parts in the position assumed shortly after the shutter is tripped for making an exposure, with the shutter blades closed preparatory to making the actual exposure and with the diaphragm leaves or blades closed down to the preselected aperture size; and Fig. 5 is a fragmentary view of the shutter parts at a slightly later stage of operation, with the shutter blades now open for making the actual exposure.

The same reference numerals throughout the several views indicate the same parts.

In certain types of cameras, particularly but not exclusively cameras of the so-called single lens reflex type, light is admitted through the shutter for the purpose of focusing the camera, both the shutter blades and the diaphragm leaves or blades being opened wide to admit the maximum amount of light for focusing. At this time, of course, light does not reach the sensitized surface of the film or plate, either because the film or plate is in a special holder which has not yet been inserted in the camera, or more usually (in the reflex type of camera) because a mirror is operatively interposed at this time between the shutter and the film, reflecting the light upwardly to a focusing screen and preventing it from reaching the film. In the shutter constructions most commonly used heretofore, the opening of the shutter blades and diaphragm leaves has been accomplished either by a special operating member on the shutter itself, requiring the user to reach around the front of the camera to the shutter, or by a special operating member built into the camera, which has increased the complexity and cost of the camera. All this is obviated according to the present invention, since the regular shutter tensioning member which is built into the camera anyhow, is used in this instance for opening the shutter blades and diaphragm leaves for focusing.

Referring now to the drawings, the shutter comprises the usual casing or housing 10 of generally cylindrical annular shape, formed with a rearward tubular extension 12 threaded internally for mounting the rear component of the lens, and externally for mounting the entire shutter on the body of the camera. The casing is divided by a transverse plate or partition 13, to which is fastened the forward lens tube 78 in which is mounted the forward component of the lens. The optical axis of the shutter passes centrally through the lens tubes 12 and 78, as usual. The front of the casing is closed by a stationary cover plate 74, held in place by a retaining ring 75 screwed on the front end of the front lens tube 78. The shutter operating mechanism, partly described below, is located in the annular part of the casing in front of the partition plate 13, while the shutter blades and diaphragm leaves or blades are mounted in the casing to the rear of the partition plate 13.

A shutter cocking shaft or tensioning shaft 14 is mounted in the annular part of the casing, with its axis substantially parallel to the optical axis, and projects rearwardly out of the back of the shutter, into the associated camera body with which the shutter is used, so that this shaft may be turned by any suitable knob or crank or other mechanism mounted on the camera body.

Fixed to the shaft 14 near its forward end is a cocking or tensioning disk 16 having gear teeth 90 extending around the major part of its periphery and a downturned ear 26 at one point where there are no gear teeth. Rotatable on the shaft 14, below or behind this tensioning disk 16, is the main driving member or master member 18 of the shutter. The main driving spring or master spring 20 of the shutter is wound around the shaft 14, and has one end 22 engaged with a fixed pin on the shutter casing, while the other end 24 is engaged with a pin on the master member 18, the spring acting in a direction to tend to turn the master member clockwise on the shaft 14 when viewed from the front of the shutter, as in Figs. 1 and 3–5. When the shaft 14 and the tensioning disk 16 are turned in a counterclockwise direction, the lug 26 on the tension disk engages a lug 28 on the master member 18 and turns the master member in a counterclockwise direction to tension the driving spring 20, the master member then being held in fully tensioned position by means of a latch part 122 engaging a latching lug 124 on the master member as seen in Fig. 3 and as further explained below.

Movable shutter blades 30, located behind the partition plate 13 as above mentioned, are mounted to swing between open and closed positions. Only one shutter blade is shown in the drawings, for the sake of clarity, although it will be understood that, as usual, any desired number of blades may be employed, five being a convenient number. Each blade is provided with a pivot 32, and the pivots of all the shutter blades engage in suitable openings in a ring member 34, the outer periphery of which is supported for rotation within the shutter casing, just behind the partition plate 13. Each blade also has one guide slot 36, the respective slots in the respective blades being engaged by respective control pins or driving pins 38 mounted on the shutter blade ring or driving ring 40 which is rotatable within the casing about the optical axis as a center.

This blade ring 40 has an arm 42 extending a substantial distance in a radial direction, within the casing, and thence extending somewhat in a circumferential direction, as seen in the drawings. This arm 42 is the driving arm of the blade ring. The shape of the periphery of the master member 18 is such that when the master member performs its running-down movement in a clockwise direction from its fully tensioned position, it will engage a pin 41 on the arm 42 to move the driving arm 42 of the blade ring first in a counterclockwise direction to shift all of the blade driving pins 38 to open the blades 30, and then will engage a pin 43 on the arm 42 to drive the arm in a clockwise direction to shift the driving pins 38 back to close the blades, by rocking them on their pivots 32, thus making an exposure. The construction of the parts for driving the blade ring from the master member may take the form shown, for example, in the copending U.S. patent application of Franz Singer, Serial No. 306,562, filed August 27, 1952 (now patent 2,785,612, issued March 19, 1957), and assigned to the same assignees as the present application. The above mentioned pins 41 and 43 of the present application correspond to the pins 50 and 58, respectively, of said Singer patent.

If it is desired to open the shutter blades, not for an exposure but for observation purposes (e.g., for focusing) this may be done by turning the ring 34 which receives the shutter blade pivots 32, while keeping the blade ring 40 stationary. Rotation of the ring 34 is obtained by moving a radial arm 44 formed on the member 34, which arm 44 extends out to the exterior of the shutter casing through a slot 45 formed in the rear wall, as seen especially in Fig. 2. A coil tension spring 46 fastened at one end to the arm 44 and at the other end to a fixed pin on the casing, constantly tends to turn the arm 44 and the ring 34 in a counterclockwise direction to keep the blades 30 closed so far as the ring 34 is concerned, although this does not prevent them from opening when the ring 40 is moved. The range of rotary movement of the ring 34 and arm 44 is limited by a pin 48 on the ring, engaging with one end or the other of an arcuate slot 50 formed in the shutter casing 10.

The shutter is also provided, as usual, with a plurality of diaphragm leaves or blades in any desired number, only one being shown at 52, for the sake of clarity. The diaphragm leaves are mounted to the rear of the shutter blades 30, as seen in Fig. 2. Each leaf 52 is supported for rotation about its main pivot 54 and also carries a second pivot 56 engaging in a control slot 58 in the diaphragm setting ring 60, there being, of course, a separate pivot 56 and control slot 58 for each of the several diaphragm leaves 52. The ring 60 is rotatably mounted in the shutter casing, and carries an operating arm 62 which extends out to the exterior of the casing through the above mentioned slot 45, and thence extends radially in a plane just to the rear of the radially extending part of the arm 44, as seen in Fig. 2. By turning the ring 60 by means of the arm 62, the diaphragm leaves 52 may be adjusted to the desired aperture or f stop setting.

A coil tension spring 64 is fastened at one end to the arm 62, and at the other end to a fixed pin on the casing, and acts in a direction to tend to turn the arm 62 and the ring 60 counterclockwise when viewed from the front of the shutter, which direction of movement tends to close the diaphragm leaves down to the smallest aperture or stop. A lug or shoulder 66 on the aperture selector ring 68 serves as an abutment limiting the counterclockwise movement of the arm 62, thus determining the extent to which the spring 64 can close down the diaphragm leaves. This ring 68 is externally mounted for rotation at the rear of the shutter, and carries an indicator arm or pointer 70 which extends radially outwardly to a position beyond the maximum radius of the shutter casing, as seen in dotted lines in Fig. 2, thence forwardly, and thence radially inwardly again to a pointer end which cooperates with an aperture or f stop scale 72 conveniently marked on the front cover plate 74 of the shutter, but shown for reference in Figs. 1 and 3 as being adjacent the periphery of the shutter, since the cover plate 74 itself is not shown in these figures. The aperture selector ring 68 is provided with suitable click stops or other detent means (e.g., notches 69 in the ring 68, engaged by a spring detent 71 mounted on a stationary part of the structure) offering substantial resistance to rotary movement, so that the selector ring may be turned by hand when desired, by overcoming the resistance of the detent means, but when set in any selected position, it offers greater resistance than can be overcome by the spring 64. Thus when the arm 62 is displaced in a clockwise direction to open the diaphragm leaves, and is then released, the spring 64 will bring the arm 62 back in a counterclockwise direction only until it engages the abutment 66 on the ring 68, in whatever position the ring 68 may have been previously set, and the spring 64 will not cause any rotary displacement of the ring 68 from its manually set position.

Mounted within the shutter casing for rotation about the front lens tube 78 is a control ring 76 which carries a radial arm 80 extending out to the exterior of the casing through a slot 82, and thence bent rearwardly as seen in Fig. 2, so as to intersect the transverse planes of the radial external parts of the arms 44 and 62. A coil tension spring 84 fastened at one end to a fixed pin in the shutter casing and at the other end to a pin on the control ring 76, constantly tends to turn this control ring in a counterclockwise direction until the arm 80 thereof comes into contact with one end 86 of the slot 82, which end forms an abutment limiting the counterclockwise turning of the ring.

This control ring 76 has part of its periphery provided with teeth 88 which mesh with the complementary teeth 90 on the tensioning disk 16. Thus, when the tensioning shaft or cocking shaft 14 is turned in a counterclockwise direction to tension the shutter ready for an exposure, the counterclockwise rotation of the disk 16, acting through the teeth 90 thereon and the teeth 88 on the control ring 76, will turn the control ring in a clockwise direction. Or, conversely, if manual force is applied directly to the external part of the arm 80 of the control ring 76 so as to turn the control ring in a clockwise direction, the teeth 88 and 90 will serve to turn the tensioning disk 16 and shaft 14 in a counterclockwise direction. The clockwise movement of the control ring 76 (whether produced by turning force applied to the shaft 14, or force applied to the arm 80) is continued until the end of a latch dog or pawl 92, mounted on a pivot 89 and urged clockwise by a spring 91, snaps behind a latching shoulder 93 on the control ring 76, as seen in Fig. 3. At the same time, another latching element 122 snaps behind the latching lug 124 on the master member, as will be further described below. During the clockwise movement of the control ring 76 to its latched position, the arm 80 thereof engages successively with the arms 62 and 44 on the respective rings 60 and 34, turning both of these rings in a clockwise direction against the force of their respective springs 64 and 46, thereby fully opening both the shutter blades and the diaphragm leaves to maximum extent, to the positions shown in Fig. 3. The control ring 76 is released from this latched position by pressing radially inwardly on the protruding and manually accessible end of the shutter trigger or release member 94, pivoted in the casing at 95 and provided with a spring 97 tending to swing the release member outwardly. When swung inwardly, one end of the release member engages the tail of the pawl 92 to turn the pawl to release it from the latching shoulder 93.

The control ring 76 carries a pin 96 which, during the above mentioned clockwise rotation of the ring, is adapted to engage the nose 98 of a toothed segment 100 pivoted on the pin 102 within the shutter casing and acted upon by a spring 104 constantly tending to rotate the segment 100 in a clockwise direction. The gear teeth on the segment 100 are in engagement with a clockwork escapement mechanism of suitable known construction, serving to retard the running-down motion of the segment in a clockwise direction. The movement of the segment may perform any desired known function. For example, it may close an electric switch in predetermined or synchronized time relationship to the opening of the shutter blades. Neither the details of the escapement mechanism nor the details of the synchronizer switch operation are important to the present invention, so are not illustrated in the present drawings, but the gear segment may function in a general way similar to the gear segment 124 in applicant's copending U.S. patent application filed July 9, 1952, Serial No. 297,901 (now bandoned).

A cam or projection 106 on one edge of the gear segment engages an angular lug 108 on a locking lever 110 which is pivoted to swing on the pivot 112 in the shutter casing, and which is urged in a counterclockwise direction on its pivot by a spring 114, which tends to keep the lug 108 in engagement with the part 106 of the gear segment. The spring 104 is, however, stronger than the spring 114, so that unless other force is applied, the spring 104 will swing both the segment 100 and the locking lever 110 in a clockwise direction on their respective pivots, to the extreme position determined by the stop pin or abutment 116, as seen in Fig. 1.

The locking lever 110 is further provided with a projection or nose 118 which cooperates with an inclined cam surface 120 formed on the control ring 76. The lever also has a locking tooth or pawl portion 122 which is adapted to engage and latch the lug 124 of the main driving member or master member 18 to retain the master member in fully tensioned or wound condition as shown in Fig. 3, at the completion of the tensioning operation, as above mentioned.

The master member 18 also carries a cam portion 126 which cooperates with a suitable gear train escapement mechanism (not shown) accommodated within the shutter casing 10, to retard the running-down motion of the master member, in order to time the shutter for various different adjustable lengths of exposure. Such gear train escapement retarding mechanisms are well known in the art, and the details are not important for purposes of the present invention. The construction may, however, be similar in a general way to that disclosed in the above mentioned copending Singer application, Serial No. 306,562, now Patent Number 2,785,612.

The retarding action of the escapement mechanism acting on the master member may be adjusted and controlled in suitable known manner, as by turning the shutter speed adjusting ring or selector ring 128 (see Fig. 2) rotatably mounted at the front of the shutter and corresponding in a general way to the speed adjusting ring 63 in the Deckel and Geiger U.S. Patent 1,687,123, issued October 9, 1928. While the shutter of the present application is quite different in many respects from the shutter shown in said Deckel and Geiger patent, yet this patent does disclose how a rotatable speed control ring may serve to control the retarding effect produced by an escapement mechanism, and the same principles of control may be applied to the retarding escapement mechanism of the present shutter.

The operation of the shutter is as follows: The shutter is shown in Fig. 1 in its rest or run-down position assumed at the completion of an exposure. The shutter blades 30 are closed, and the diaphragm leaves or blades 52 are closed down to whatever stop or aperture has been selected by positioning the pointer 70 in conjunction with the scale 72; in this instance, a relatively small stop or aperture of $f{:}22$.

If the operator now desires to make an exposure, and to focus the camera or inspect the view prior to making the exposure, he turns the shaft 14 in a counterclockwise direction (when viewed from the front of the shutter) by any suitable knob, crank, or other operating mechanism, preferably mounted on the camera today near the rear thereof so as to be readily accessible. Before doing this, however, suitable precautions are taken to avoid unintentional exposure of the film or other sensitized material, which can be done, for example by moving the reflex mirror of the camera into focusing position, whereby any light entering through the lens is reflected to the focusing screen and cut off from reaching the sensitized film.

As the shaft 14 is turned in a counterclockwise direction, it carries the tensioning disk 16 with it, since the disk is fixed to the shaft. The counterclockwise rotation of the disk causes the ear 26 thereof to engage the lug 28 on the master member 18, thus swinging the master member correspondingly in a counterclockwise direction, and at the same time the gear teeth 90 on the disk 16 turn the gear teeth 88 on the control ring 76, swinging the control ring in a clockwise direction.

The clockwise turning of the ring 76 causes the arm 80 thereof to engage the arm 62 of the diaphragm control ring 60 and also the arm 44 of the ring 34, to swing both in a clockwise direction. The clockwise swinging of the ring 60 causes the slots 58 therein to act on the pins 56 of the diaphragm leaves, to open the diaphragm to maximum aperture. The clockwise swinging of the ring 34 moves the pivot pins 32 of the shutter blades 30 so as to open fully all of the shutter blades, notwithstanding the fact that the regular operating pins 38 in the blade ring 40 remain stationary at this time.

As the control ring 76 approaches its extreme position in a clockwise direction, the pin 96 thereon engages the tail 98 on the gear segment 100 and swings this segment against the force of its spring 104, so that this segment no longer interferes with counterclockwise turning of the latching member 110. Therefore, when the control ring 76 reaches its fully actuated or tensioned position, the nose 122 on the latching member 110 snaps behind the latching lug 124 on the master member, under the influence of the spring 114, and at the same instant that the master member becomes latched, the latching pawl 92 likewise snaps behind the latching shoulder 93 of the control ring 76, latching it in position, so that the parts are now in the positions shown in Fig. 3. Both the shutter blades and the diaphragm leaves are fully open, and are latched in the open position, so the operator may take as much time as desired in order to focus the camera or observe the view.

When the operator is ready to make the actual exposure, he presses inwardly on the exposed part of the shutter trigger or release member 94, which swings the latch 92 and releases it from the shoulder 93. Then, under the influence of the spring 84, the control ring 76 starts to swing backwardly in a counterclockwise direction toward its rest position, but the master member 18 still remains latched by the pawl 122. During the first part of the return movement of the control ring 76, the arm 80 releases the arm 44 of the ring 34, so that the spring 46 may return the ring 34 to its normal rest position, thereby closing the shutter blades 30. About this time or soon afterwards, the arm 80 on the control ring releases also the arm 62 of the ring 60, so that the latter is restored to rest position by its spring 64, thereby closing the diaphragm leaves down to whatever stop or aperture size has been previously selected by the positioning of the diaphragm control member 68, 70. During this interval of travel of the control ring 76, after the shutter blades 30 have been fully closed but before the master member is unlatched for making the actual exposure, the reflex mirror of the camera is moved from its focusing position to its exposure position, so that when the shutter blades are subsequently opened, light may reach the film or other sensitized material.

Near the end of the return movement of the control ring 76, just before the arm 80 thereof reaches the abutment 86, the cam portion 120 on the control ring engages the nose 118 of the master member latching lever 110, and moves this lever against the force of its spring 114, to withdraw the latching pawl portion 122 from the latching lug 124 on the master member. The position of the parts just at this instant is shown in Fig. 4. The master member 18, now being released, is able to turn clockwise under the influence of the master spring 20, and at a rate or speed controlled by the escapement retarding mechanism which cooperates, as above mentioned, with the portion 126 on the master member.

During the first part of the clockwise or running-down motion of the master member 18, it acts on the blade ring 40 to turn the ring in a counterclockwise direction, as above explained, to open all of the shutter blades 30 by action of the pins 38 in the slots 36, while meanwhile the ring 34 remains stationary. This open position is shown in Fig. 5. Thus the exposure is made. Later, after an interval determined by the adjustment of the escapement retarding mechanism which acts on the master member, the master member during the latter part of its running-down movement swings the blade ring 40 back in a clockwise direction, again closing the blades to the normal rest position or run-down position shown in Fig. 1.

In some instances, the proportions of the latching parts may be so designed that the cam surface 120 acting on the tail 118 of the latching pawl 110 does not quite release the pawl 122 from the latching lug 124, but merely moves it to a position ready for release upon a slight further movement. This further movement may be produced by the running-down motion of the member 100 under the influence of its spring 104 and as controlled by the escapement retarding mechanism meshing with the gear teeth on the segment 100. It will be understood that the gear segment 100 can swing clockwise under the influence of its spring 104 at this time, because the pin 96 has already moved away from the arm 98, thus allowing the spring 104 to start to swing the gear segment. When the gear segment nears the end of its travel (after a delay depending upon the action of the retarding escapement connected to the gear segment) the portion 106 on the segment will engage the lug 108 of the latching lever 110 and give this lever the slight additional movement necessary to release the latching pawl 122 from the latching lug 124, thus initiating the running-down movement of the master member, to make the exposure. But in either event, whether the master member is unlatched directly by the action of the cam 120 on the nose 118, or whether it is unlatched by the action of the gear segment 100 after the pin 96 is withdrawn from the lug 98, it is true in either case that the master member is unlatched as a result of movement of the control ring 76, and thus the master member can be properly said to be under the influence of or be controlled by the control ring 76.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter including a casing, a blade driving ring, a blade holding ring, a diaphragm adjusting ring, and a control ring all rotatably carried by said casing, shutter blades each having one pivotal connection to said blade driving ring and another pivotal connection to said blade holding ring, diaphragm leaves each having a pivotal connection to said diaphragm adjusting ring, a master member mounted for movement between a rest position and a tensioned position and operatively connected to said blade driving ring to move the same first to open and then to close the blades upon a running-down movement of said master member from tensioned position to rest position, a tensioning member including a rotary shaft coaxial with said master member and operable to move said master member from rest position to tensioned position, an operative connection including gear teeth mounted on and turning with said rotary shaft and other gear teeth meshing therewith on said control ring for turning said control ring upon tensioning operation of said tensioning member, and an operative connection between said control ring and said blade holding and diaphragm adjusting rings to shift both of said last two rings to open the shutter blades and the diaphragm leaves upon predetermined movement of said control ring by said tensioning member without movement of said blade driving ring.

2. A construction as defined in claim 1, further including a latch for holding said master member in tensioned position, and mechanism controlled by predetermined movement of said control ring in a blade closing direction for releasing said latch so that said master member may move from tensioned position to rest position.

3. A construction as defined in claim 1, in which said blade holding ring and diaphragm adjusting ring are each provided with radially extending arms, and in which said control ring has a portion for engaging both of said arms to move said blade holding and diaphragm adjusting rings when said control ring is moved by said tensioning member.

4. A photographic shutter comprising a casing having an exposure aperture therethrough and an optical axis extending through said aperture, a series of blades movable transversely to said aperture to and from positions at least partially across said aperture, each blade having two spaced pins, an operating ring rotatable about said optical axis as a center and engaging one pin of each blade of said series to swing said blades transversely to said aperture when said operating ring is rotated, first spring means tending to rotate said operating ring in a blade closing direction, a control ring also rotatable about said optical axis as a center, gear teeth on said control ring, a shaft extending parallel to and offset radially from said optical axis, a gear mounted on said shaft and meshing with said gear teeth on said control ring to turn said control ring in one direction when said shaft is turned in one direction, other spring means tending to turn said control ring in a reverse direction, a releasable latch operatively engaging said control ring when it has been turned to a predetermined extent in said one direction for holding said control ring against movement in said reverse direction, means on said control ring for engaging said operating ring when said control ring is turned in said one direction to turn said operating ring correspondingly in a direction against the force of said first spring means, a second series of blades also movable transversely to said aperture, each blade of said second series also having two spaced pins, a second operating ring also rotatable about said optical axis as a center and engaging one pin of each blade of said second series to swing said blades of said second series transversely to said aperture when said second operating ring is rotated, and second spring means tending to rotate said second operating ring in a blade closing direction, said control ring engaging both of said operating rings when said control ring is turned in said one direction to turn both of said operating rings correspondingly in directions against the respective forces of said first spring means and second spring means, the blades of one series being shutter blades and the blades of the other series being iris diaphragm blades, the turning of both operating rings by said control ring serving to open both series of blades for passage of light for focusing.

5. A photographic shutter comprising a casing having an exposure aperture therethrough and an optical axis extending through said aperture, a first blade ring rotatable about said optical axis as a center and normally stationary during the making of an exposure, said first ring being rotatable between a rest position and an actuated position, a second blade ring also rotatable about said optical axis as a center and normally moving during the making of an exposure, said second ring being rotatable between a rest position and an actuated position, a series of shutter blades pivotally connected to both of said blade rings in such manner that said blades close said exposure aperture when both of said blade rings are in their rest positions and open said exposure aperture when either one of said blade rings is moved to its actuated position, a series of iris diaphragm leaves for adjustably and partially closing said exposure aperture, a diaphragm ring also rotatable about said optical axis as a center and pivotally connected to said diaphragm leaves to control the positions thereof, said diaphragm ring being rotatable from an open position in which said diaphragm leaves are at maximum aperture to a closed position in which said diaphragm leaves are at minimum aperture, spring means tending to move said first blade ring from actuated position toward rest position and tending to move said diaphragm ring from open position toward closed position, a master member rotatable between a rest position and a tensioned position, said master member being operatively connected to said second blade ring to cause said second blade ring to move from rest position to actuated position and back to rest position upon movement of said master member from its tensioned position to its rest position, a releasable latch for holding said master member in its tensioned position, a control ring rotatable about said optical axis as a center, through a forward movement in a first direction and a return movement in a reverse direction, interconnected means for concomitantly turning said control ring through its full range in its said first direction and turning said master member from its rest position to its tensioned position to be latched therein by said latch, cooperating engaging parts on said control ring, said first blade ring, and said diaphragm ring for turning said first blade ring from its rest position to its actuated position and for turning said diaphragm ring to its open position by the motion of turning said control ring through its said forward movement, said cooperating engaging parts serving to hold said first blade ring in its actuated position and said diaphragm ring in its open position against the force of said spring means, so long as said control ring remains at the end of its travel in said first direction, movement of said control ring in said reverse direction releasing the holding force on said first blade ring and said diaphragm ring so that said spring means may move said first blade ring toward its rest position and said diaphragm ring toward its closed position, and means operated by said control ring near the end of its return movement in said reverse direction for releasing said latch so that said master member may turn from its tensioned position to its rest position to operate said second blade ring to open and close said shutter blades to make an exposure.

6. A construction as defined in claim 5, in which said master member rotates on an axis offset from said optical axis, said construction further including an operating shaft concentric with the axis of rotation of said master member, and in which said interconnected means for concomitantly turning said control ring and turning said master member includes a part on said shaft for engaging and turning said master member upon rotation of said shaft, a gear on said shaft, and gear teeth on said control ring meshing with said gear so that said shaft and said control ring turn together.

7. A photographic shutter comprising a casing having an exposure aperture therethrough and an optical axis extending through said aperture, a first blade ring rotatable about said optical axis as a center and normally stationary during the making of an exposure, said first ring being rotatable between a rest position and an actuated position, a second blade ring also rotatable about said optical axis as a center and normally moving during the making of an exposure, said second ring being rotatable between a rest position and an actuated position, a series of shutter blades pivotally connected to both of said blade rings in such manner that said blades close said exposure aperture when both of said blade rings are in their rest positions and open said exposure aperture when either one of said blade rings is moved to its actuated position, a series of iris diaphragm leaves for adjustably and partially closing said exposure aperture, a diaphragm ring also rotatable about said optical axis as a center and pivotally connected to said diaphragm leaves to control the positions thereof, said diaphragm ring being rotatable from an open position in which said diaphragm leaves are at maximum aperture to a closed position in which said diaphragm leaves are at minimum aperture, spring means tending to move said first blade ring from actuated position toward rest position and tending to move said diaphragm ring from open position toward closed position, a master member rotatable between a rest position and a tensioned position, said master member being operatively connected to said second blade ring to cause said second blade ring to move from rest position to actuated position and back to rest position upon movement of said master member from its tensioned position to its rest position, a releasable latch for holding said master member in its tensioned position, a plurality of rotary control members geared to each other to rotate in unison from a rest position to an actuated position and vice versa, a spring tending to move said control members from actuated position to rest position, a releasable latch separate from said latch of said master member for holding said control members in their said actuated position against the force of said last mentioned spring, cooperating engaging parts on said control members and said master member and said first blade ring and said diaphragm ring and effective upon movement of said control members from rest position to actuated position for turning said master member from its rest position to tensioned position and turning said diaphragm ring from its closed position to open position and turning said first blade ring from its rest position to actuated position to open said shutter blades without movement of said second blade ring, and a cam on one of said rotary control members for causing release of said latch of said master member during the latter part of return movement of said control members from their actuated position to rest position.

References Cited in the file of this patent

UNITED STATES PATENTS

| | | |
|---|---|---|
| 2,206,132 | Stewart | July 2, 1940 |
| 2,333,820 | Riddell | Nov. 9, 1943 |

(Other references on following page)

UNITED STATES PATENTS

| | | |
|---|---|---|
| 2,380,610 | Pignone | July 31, 1945 |
| 2,480,973 | Schwarz | Sept. 6, 1949 |
| 2,483,025 | Schwarz | Sept. 27, 1949 |
| 2,494,042 | Fuerst | Jan. 10, 1950 |
| 2,527,781 | Willcox | Oct. 31, 1950 |
| 2,701,992 | Gorey | Feb. 15, 1955 |
| 2,772,614 | Rentschler | Dec. 4, 1956 |
| 2,785,612 | Singer | Mar. 19, 1957 |

FOREIGN PATENTS

| | | |
|---|---|---|
| 631,201 | Great Britain | Oct. 28, 1949 |